March 2, 1937. T. C. DELAVAL-CROW 2,072,515

ANTIFRICTION BEARING

Filed Nov. 27, 1934

INVENTOR:
THOMAS C. DELAVAL-CROW,
BY
HIS ATTORNEY.

Patented Mar. 2, 1937

2,072,515

UNITED STATES PATENT OFFICE 2,072,515

ANTIFRICTION BEARING

Thomas C. Delaval-Crow, Bristol, Conn., assignor to General Motors Corporation, Detroit, Mich., a corporation of Delaware Application November 27, 1934, Serial No. 755,017

3 Claims. (Cl. 308—235)

This invention relates to antifriction bearings and comprises all of the features of novelty herein disclosed. An object of the invention is to provide an improved separator or cage, especially for high speed thrust bearings. Another object is to provide a bearing separator or cage with simple and efficient means to procure lubrication and thus improve the life.

To these ends and also to improve generally upon devices of this character, the invention consists in the various matters hereinafter described and claimed. In its broader aspects, the invention is not necessarily limited to the specific constructions selected for illustrative purposes in the accompanying drawing in which Fig. 1 is an elevation of a thrust bearing, a portion of the bearing being broken away.

Figure 1:
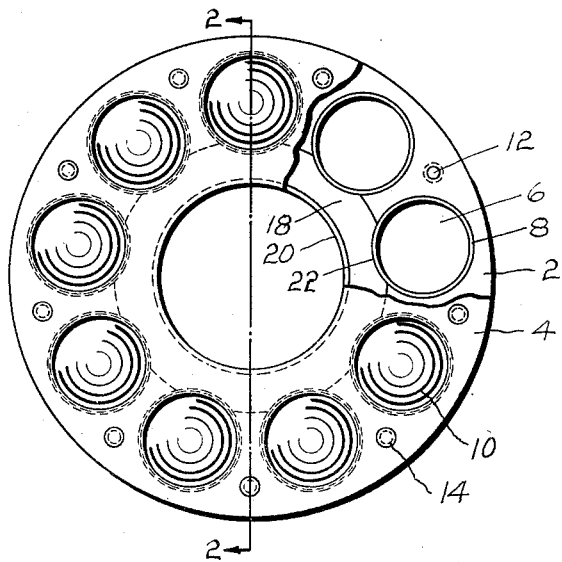

Hitherto antifriction bearing cages, especially for high speed thrust bearings, have been so constructed that lubricant cannot easily gain access to the rolling elements and the initial supply of lubricant is slung away from the rolling elements by centrifugal force so that the cage runs dry and soon fails. The present invention provides simple means to facilitate access of lubricant to the rolling elements. The cage comprises a pair of mating rings 2 and 4 provided with openings 6 whose rims or edges 8 are shaped to conform to rolling elements 10, herein shown as balls. Each ring has countersunk openings 12 between the ball openings to receive rivets 14 which secure the rings together.

Figure 2:
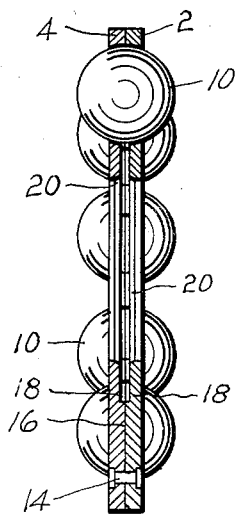
Fig. 2 is a cross sectional view on the line 2—2 of Fig. 1.

As indicated at 16 in Fig. 2, the rings meet flatwise between the balls, such contacting surfaces extending from the outer periphery to points adjacent the inner periphery. The large area of the abutting surfaces gives the cage great rigidity. Near their inner peripheries, the rings are provided with mating recesses 18 forming a circular pocket for lubricant. The inner edges of the rings are bevelled or countersunk as indicated at 20 to direct lubricant to the recesses. The recesses 18 break through or intersect the inner segments of the ball openings 6 as indicated at 22 in Fig. 1 so that lubricant working outwardly in the recesses has direct access to the inner segments of the balls. The recesses 18 may be packed with lubricant or lubricant may be fed into them.

Figure 3:
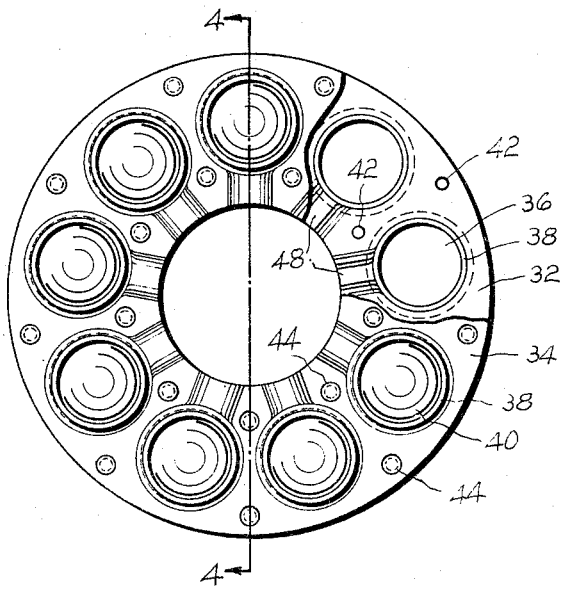
Fig. 3 is a view similar to Fig. 1 of a modified construction.
Figure 4:
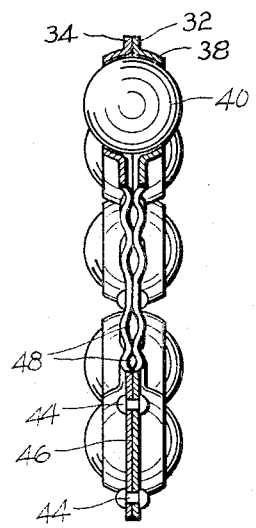
Fig. 4 is a cross sectional view on the line 4—4 of Fig. 3.

In Figs. 3 and 4, a pair of mating rings 32 and 34 have openings 36 provided with expanded rims or wings 38 which conform to the rolling elements 40. The rings have openings 42 in two circular series for rivets 44. As indicated best in Fig. 4, the rings engage one another flatwise at 46 between the balls, such contacting surfaces extending all the way across the rings radially. At the inner portions of the rings, between the contacting surfaces, are provided a series of radially extending recesses 48 to which lubricant is supplied. These radial recesses are conveniently formed by expanding or bowing the rings between the inner edges of the latter and the edges of the ball pockets. Such expanded portions are in radial alignment with the ball pockets and form mating recesses alternating with the flattened areas. Lubricant may be fed into the recesses 48 or packed therein, and, as in the case of Figs. 1 and 2, it will work out centrifugally to the balls.

I claim:

1. In a device of the character described, a pair of connected rings having openings for rolling elements, the rings abutting against one another between the openings, rolling elements in the openings, the inner peripheral portions of the rings having circular recesses mating with one another and leaving the inner edges of the rings spaced apart, and said spaced edges being bevelled outwardy towards the recesses; substantially as described.

2. In a device of the character described, a pair of connected rings having openings for rolling elements, the rings being of thin metal and abutting against one another between the openings, rolling elements in the openings, and the inner peripheral portions of the rings having expanded portions mating with one another and extending radially to the openings; substantially as described.

3. In a device of the character described, a pair of thin metal rings having openings, rolling elements in the openings, the rings engaging one another flatwise between the openings, and the inner peripheral portions of the rings comprising a series of flattened areas engaging one another and alternating with a series of expanded portions arranged in radial alignment with the openings and forming mating recesses leading radially from the inner edges of the rings to the openings; substantially as described.

THOMAS C. DELAVAL-CROW.